(12) United States Patent
Kaeb et al.

(10) Patent No.: US 6,675,958 B2
(45) Date of Patent: Jan. 13, 2004

(54) TUBE CONVEYOR

(75) Inventors: Todd W. Kaeb, Loda, IL (US); Leslie K. Kaeb, Francesville, IN (US); Donald Slagel, Fairbury, IL (US); Mark Slagel, Strawn, IL (US)

(73) Assignee: Kaeb Sales Inc., Cissna Park, IL (US)

( * ) Notice: Subject to any disclaimer, the term of this patent is extended or adjusted under 35 U.S.C. 154(b) by 0 days.

(21) Appl. No.: 10/218,254

(22) Filed: Aug. 13, 2002

(65) Prior Publication Data

US 2003/0034232 A1 Feb. 20, 2003

Related U.S. Application Data

(60) Provisional application No. 60/312,648, filed on Aug. 15, 2001.

(51) Int. Cl.$^7$ ................................................ B65G 21/00
(52) U.S. Cl. ................................ 198/860.5; 198/860.3; 198/819
(58) Field of Search .......................... 198/860.5, 860.3, 198/860.1, 819, 818

(56) References Cited

U.S. PATENT DOCUMENTS

| | | | | |
|---|---|---|---|---|
| 2,803,950 A | * | 8/1957 | Bayston | 198/860.3 |
| 3,212,628 A | * | 10/1965 | Massey et al. | 198/860.5 |
| 3,311,221 A | * | 3/1967 | Burkitt et al. | 198/819 |
| 3,724,646 A | * | 4/1973 | Kornylak | 198/819 |
| 5,052,545 A | * | 10/1991 | Gongen | 198/818 |
| 6,170,644 B1 | * | 1/2001 | Nakaegawa et al. | 198/811 |

* cited by examiner

*Primary Examiner*—Douglas Hess
(74) *Attorney, Agent, or Firm*—Emrich & Dithmar

(57) ABSTRACT

A tube conveyor arranges the location of the output drive roller such that the upper edge of the conveyor belt lies in a plane, defined by the upturned edges of the belt inside the tubular housing. A saver plate is mounted to each side of the output roller to reduce side spillage of particulate matter being transported.

3 Claims, 4 Drawing Sheets

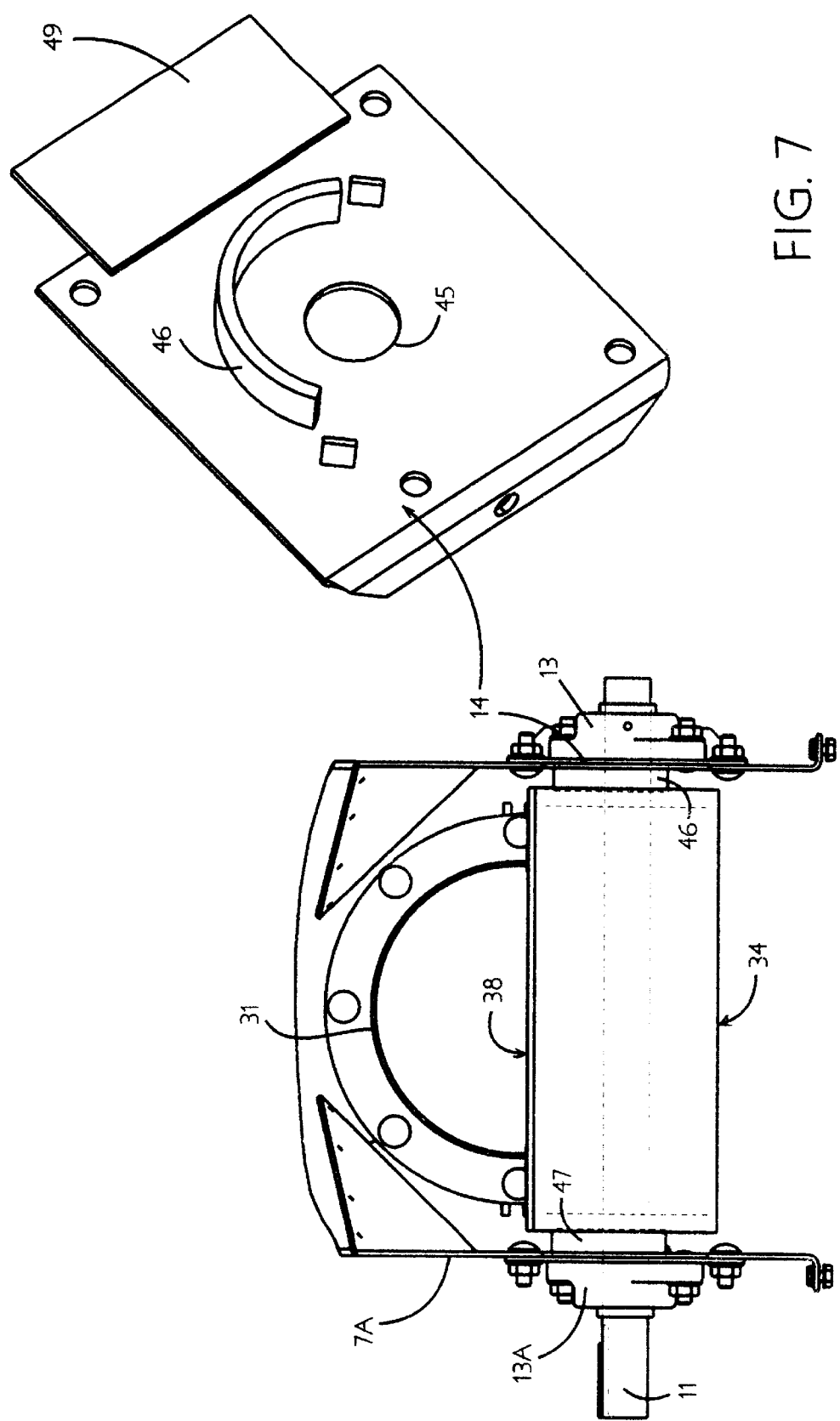

TUBE CONVEYOR

RELATED APPLICATION

This application claims benefit under 35 U.S.C. §120 of U.S. Application No. 60/312,648, filed Aug. 15, 2001, for "Improvements in Tube Conveyor".

FIELD OF THE INVENTION

The present invention relates to conveyors of the type referred to as "tube" conveyors. A tube conveyor uses a continuous conveyor belt which is normally flat. The upper or delivery run of the conveyor on which materials are being moved passes through a housing in the form of a tube, normally, but not necessarily, having a circular cross section. The exact shape and dimensions of the tube and belt are not significant.

BACKGROUND OF THE INVENTION

Conventional tube conveyors are arranged such that the belt passes over two cylindrical rollers, one at the input end and the other at the output end of the conveyor. Typically, but not necessarily, the input roller is an idler roller; and the output roller is driven by a motor, so it is referred as the drive roller. The input roller could be driven, however, and the output roller could be an idler.

The continuous or endless conveyor belt is flat, of course, when passing over the rollers and it is flat in the return run between the drive roller and the input roller. However, in the delivery run (when the conveyor is transporting material from the input roller to the output roller) the conveyor belt passes through the tubular housing or simply "tube" (a term which is intended to be broadly construed) and to include all equivalent curved cross sections).

Before entering the tube, the edges of the conveyor belt begin to curve gradually upward, typically from the point at which it leaves the input roller. While the conveyor belt passes through the tube, the edges of the belt are turned upwardly and the belt is curved to conform to the shape of the tubular housing. Material on the conveyor forces the belt into contact and conformation with the lower interior surface of the tubular housing. As the belt leaves the tubular housing it flattens out in smooth transition until it is in wrapping engagement with the drive roller.

Two problems have arisen with tube conveyors of the type described. One problem is that there is a tendency for materials, particularly granular or particulate material such as seed, sand, gravel or the like, to spill off the edges of the conveyor belt in the transition region as the belt leaves the tubular housing and flattens out over the drive roller. In particular, where the conveyor passes over the output or drive roller, the belt is flat, and there is a tendency (caused in part by a vibrating motion of the drive roller and also because the belt becomes flat while the materials are in a heap) for the material being conveyed to roll off the conveyor before being delivered, as the belt is being moved over the output drive roller.

A second problem exists with tube conveyors of this type in that in a conventional arrangement, the frictional drive force on the belt induced by the drive roller is uneven across the length of the roller (i.e., the width of the belt). Uneven force on the belt at this location causes uneven wear on the belt, and loss of friction between the roller and belt, thereby decreasing the useful life of the belt and diminishing its ability to convey material reliably.

SUMMARY OF THE INVENTION

The present invention addresses the first problem mentioned above by incorporating adjacent the drive roller, a pair of side bearing mount plates (sometimes called "saver" plates) which extend vertically and perpendicular to the axis of the drive roller. The saver plates are mounted to the sidewalls of the transition housing and bearing mounts for the roller are mounted to the saver plates so that the saver plates are positioned adjacent the output roller even if the output roller is adjusted in position.

A curved baffle, fixed to the saver plate of each side wall, is located so that it extends into a recess on the adjacent or opposing side of the output roller. Thus, the curved baffle is nested within the side of the output roller so that the conveyor belt overlaps the innermost edge of the curved baffles. The curvature of the baffles conforms to the curvature on the lateral recess within the output roller so that any material which would otherwise tend to fall down between the roller and the side walls is nevertheless delivered to the output chute at a location very close to the delivery end of the output roller.

The problem of uneven force on the conveyor belt mentioned above is addressed by placing the uppermost surface of the drive roller at a location approximately along a plane extending parallel to the upper edges of the belt while the belt is in the tubular housing. In other words, whether the tubular housing is inclined or horizontal, the edges of the curved conveyor belt inside the tubular housing, define a plane. That plane, which is referred to as the Adjustment Plane, is parallel to the axis of the tubular housing. Thus, if the tubular housing is horizontal, the Adjustment Plane is also horizontal. The Adjustment Plane assumes the angular orientation of the axis or center of the tubular housing. By extending this plane outwardly, and adjusting the upper edge of the drive roller to align with the Adjustment Plane, we have found that the force on the conveyor belt exerted by the drive roller is substantially equal across the width of the belt as it passes over the drive roller, thereby improving performance and increasing the life of the conveyor belt.

Other features and advantages of the present invention would be apparent to persons skilled in the art from the following detailed description of a preferred embodiment accompanied by the attached drawing wherein identical reference numerals will refer to like parts in the various views.

BRIEF DESCRIPTION OF THE DRAWINGS

FIG. 6 is an end view similar to FIG. 2 with the upper run of the belt shown on the conveyor; and FIG. 7 is a perspective view of the saver plate for the delivery end of the conveyor seen in FIG. 6.

DETAILED DESCRIPTION OF THE ILLUSTRATED EMBODIMENT

Figure 1:
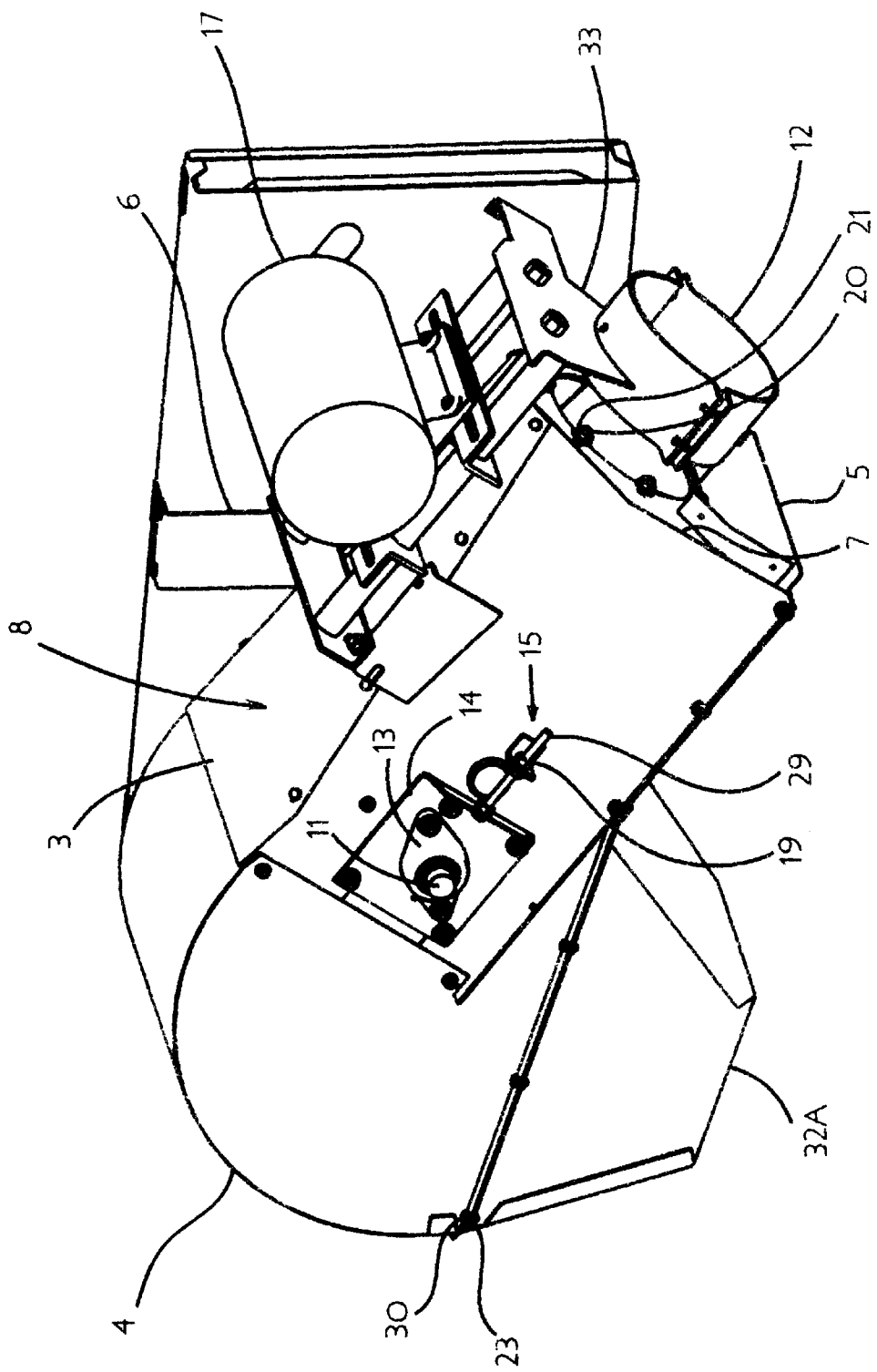
FIG. 1 is an upper, rear, left side perspective view of the output section of the tube conveyor.

Referring first to FIG. 1, there is shown an output section of a tubular conveyor. The output section includes a transition housing 8 which extends from the tubular conveyor housing (not seen in FIG. 1 but designated 31 in FIG. 2) to a hood 4 which acts to discharge the output of the conveyor into a container or truck or box located directly beneath the hood. The transition housing 8 includes two side plates, 7 and 7A in FIG. 2, and a cover 3, as well as a bottom plate 5. As used herein, "left" and "right" have reference to the left and right sides of an observer looking in the direction of movement of material on the top or delivery run of the conveyor belt.

Figure 2:
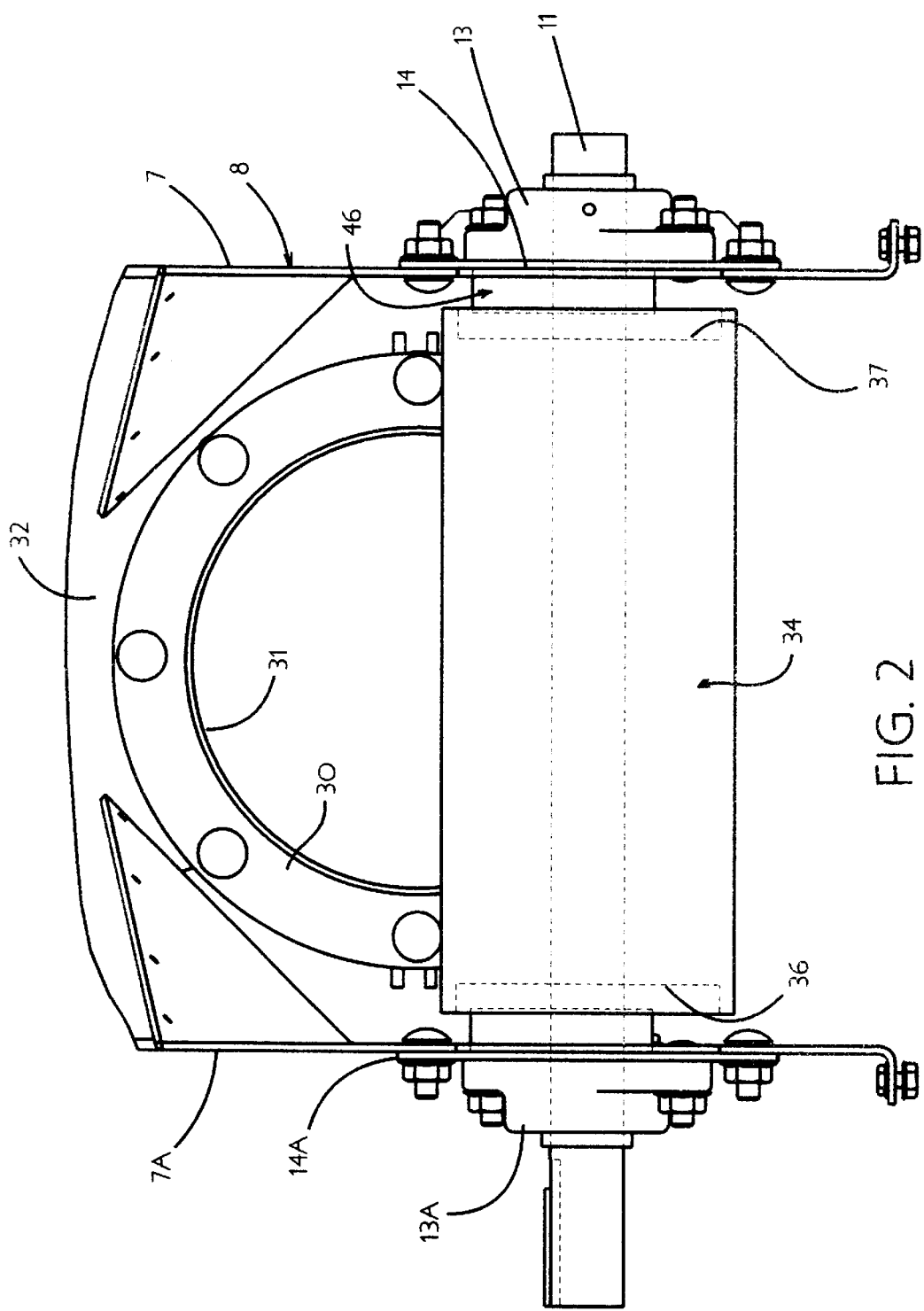
FIG. 2 is an end view looking into the tube conveyor without the belt, taken from the delivery or output end.

Referring to the lower right-hand portion of FIG. 1, an upper and a lower semi-cylindrical band are bolted to the tubular housing to form a clamp support 12 for the output load of the conveyor tube 31. The upper band serves as a base for a motor mount 33. As best seen in FIG. 2, a mounting flange 30 is bolted by fasteners 20, 21 to an endwall of the housing 4. At the output end, the hood 4 of sheet metal is mounted to the transition housing 8. The hood 4 is open at its bottom to funnel grain or other materials moved by the conveyor into the hood where the material falls under gravity through the discharge opening 32A.

A motor 17 is mounted to the top wall of the housing 8 and to clamp support 12 by bracket 33. Motor 17 drives the right side of a drive shaft, the left end of which is seen at 11. The motor 17 drives the shaft 11 by means of a conventional belt and pulley arrangement which persons skilled in the art could readily arrange to drive the left side of shaft 11 or the input roller (on either side). The pulley is keyed to the right side of shaft 11. The shaft 11 is secured in a pair of end bearing housings, one of which is seen in FIG. 1 and designated 13. The bearing housing 13 is bolted to a bearing mount (or "saver") plate 14 which, in turn, is mounted to the side wall 7 of transition housing 8 by means of bolts.

A tensioning device generally designated 15 including a fixed nut 19 and a threaded top bolt 29, the end of which is rotatably mounted to the saver plate 14, provides a means for adjusting the output shaft 11 and tensioning the conveyor belt, as will be apparent. A similar bearing mount 13A and saver plate 14A are included for the right side of the shaft 11, as seen in FIG. 2. A belt guard 6 (FIG. 1) is included for safety reasons.

In operation, material is carried by the belt, as will be more fully described below, into the transition housing 8 where the belt undergoes a transition from the curved profile of the tubular housing (see 31 in FIG. 2) to a flat profile while entrained about the drive roller, and then to the return run of the belt. Material is delivered over the end of the drive roller 34 driven by the shaft 11 into the hood 4 where it is delivered under gravity through the outlet opening 32A at the bottom of the hood 4 in FIG. 1.

As apparent to persons skilled in the art, the section of tubing 31, usually in a cylindrical form (i.e. circular cross section), is connected to the end wall 32. The conveyor belt runs through the tubular housing 31, transition housing 8 and into the hood 4 where the belt opens from a curved shape to a flat shape, when viewed from the end.

Turning now to FIG. 2, the flange 30 of conveyor tubular housing 31 is mounted to end plate 32 which is a part of the transition housing 8. The left side bearing mount 13 and the mounting plate 14 are fastened to the left wall 7 of the transition housing 8. Similarly, on the right side of the tubular housing 31, the right end of the shaft 11 keyed to receive a pulley (which is not shown), and the right side of the shaft 11 is supported by a bearing mount 13A which is mounted to a bearing mounting plate 14A which, in turn, is fastened to the right side wall 7A of the transition housing 8.

Drive roller 34 is mounted to the shaft 11; and the sides of the roller 34 are recessed or undercut as seen at 36, 37.

Figure 3:
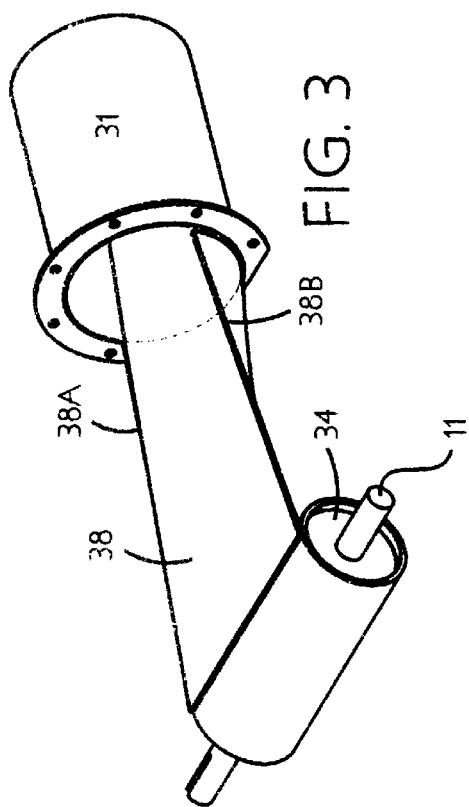
FIG. 3 is a diagrammatic view, in perspective, of the delivery end of a tube conveyor.

The conveyor belt is not shown in FIG. 2 for clarity, but it is entrained about the drive roller 34. The upper run of the belt is seen in FIGS. 3 and 6 and designated 38. The lower run of the belt is not seen in FIG. 6 for clarity.

Figure 4:
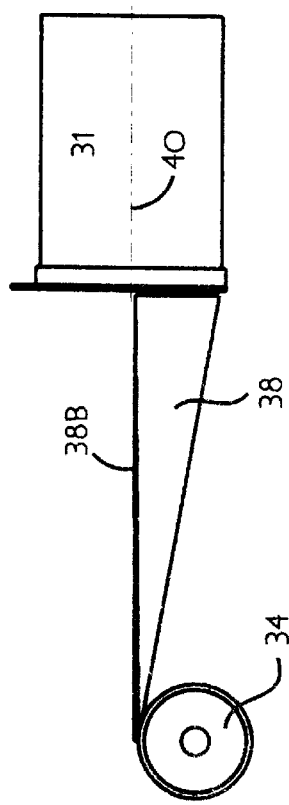
FIG. 4 is a left side view of the apparatus of FIG. 3.
Figure 5:
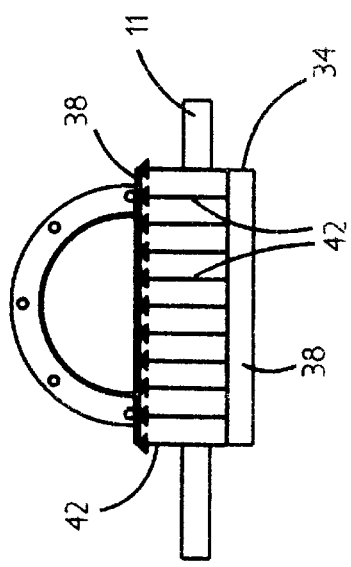
FIG. 5 is an end view taken from the left side of FIG. 4 with a graphic representation of the force induced on the belt by the drive roller.

Turning now to FIGS. 3–5, the tubular housing 31 receives the conveyor belt, that is, the delivery portion of the conveyor belt as seen at 38. The conveyor belt is then entrained around the output roller 34 in partial wrapping engagement, and returns along a path to the input roller, not seen in FIGS. 3–5, within the transition housing 8 (FIG. 1) but below the tubular housing 31. When the belt 38 is within the tubular housing 31 (i.e. the delivery run), the two edges 38A and 38B of the conveyor belt 38 are turned upwardly, and the longitudinal center line of the conveyor belt 38 is located at the bottom of the tubular housing 31.

As the conveyor belt 38 exits the tubular housing 31, it transforms from the curved profile within the housing 31 to a flat profile as it in wraps about roller 34 as best seen in FIGS. 3 and 4.

The axis of the housing 31 is indicated by the dash line 40 in FIG. 4. It will be observed that the edges (see left edge 38B in FIG. 4) of the conveyor belt 38 define a plane which lies substantially along the axis 40, and the extension of that plane, called the Adjustment Plane, intersects with the top of the roller 34, that is, the peripheral length of the roller surface which receives the belt.

It has been found that by adjusting the top of the roller 34 to lie in the Adjustment Plane, the friction force induced on the belt is substantially uniform along the width of the conveyor belt 38 as it commences being pulled (i.e., driven) by the roller 34. This uniform friction force is pictorially indicated by the arrows 42 of uniform height in FIG. 5. In short, the plane defined by the edges of the conveyor belt as they are located within the tubular housing 31 intersect substantially with the top of the drive roller 34. It is not necessary that the Adjustment Plane lie along the axis of the conveyor tube 31 if the conveyor belt has a width shorter or longer than in the illustrated embodiment, where the width of the belt is approximately equal to the inner circumference of the tube.

It has been found that if the roller 34 is placed substantially lower than the Adjustment Plane as illustrated in FIG. 4, the friction or drive force on the outer edges of the belt is greater than the friction force at the center of the conveyor. Conversely, if the roller 34 is raised relative to the position in FIG. 4 to be substantially above the Adjustment Plane, the friction force induced by the drive roller 34 in the center of the conveyor belt 38 is substantially greater than the force on the outer edges. These draft force variations create uneven friction drive forces in the conveyor belt, causing an uneven draw, and result in a reduced useful life for the conveyor belt and inferior performance.

Returning now to FIG. 2, and with further reference to FIGS. 6 and 7, the conveyor belt 38 can be seen at the top of the output roller 34 in FIG. 6. FIG. 7 shows the inside surface of the left saver plate 14 (right side of FIG. 6) as including a center aperture 45 for receiving the left side of the roller drive shaft 11, and a curved baffle 46 which extends into and is received in the recess 37 of the drive roller (FIGS. 2 and 6). Thus, the baffle 46 routes any material passing between the roller 34 and the side wall 7A of the housing 8 forwardly into the hood 4 where it is discharged through the opening 32, rather than falling laterally and either obstructing the operation of the output roller 34 or falling between the roller 34 and the transition housing 8 as waste.

As seen in FIG. 7, the forward end of the saver plate 14 may be provided with an extension 49 for further deflection of any materials tending to move over the edge of the conveyor belt 38 as it transitions from the curved or cupped shape within the tubular housing 31 to the flat surface seen in FIG. 6 on the upper surface of the drive roller 34 and is delivered to the hood 4.

We claim:

1. A tube conveyor including:

a tubular housing;

an endless conveyor belt having a delivery portion received in and supported by a lower portion of said tubular housing, the edges of said belt extending upwardly within said tubular housing to define an Adjustment Plane;

a drive roller having first and second ends and located adjacent an output end of said tubular housing, said belt extending about said drive roller in partial wrapping drive relation; and first and second mounts for said first and second ends of said drive roller mounting said driver roller such that an upper longitudinal edge of said roller lies approximately in said Adjustment Plane.

2. The apparatus of claim 1 wherein said drive roller includes a shaft and a drive surface spaced from said shaft to provide first and second undercuts, the axis of said shaft extending parallel to but beneath said Adjustment Plane, the ends of said shaft extending laterally beyond the edges of said roller drive surface and supported by said first and second mounts respectively, said apparatus further comprising:

first and second bearing mounts carrying said first and second ends of said roller shaft respectively;

first and second saver plates mounted respectively to said first and second bearing mounts and extending fore and aft of said bearing mounts; and first and second curved baffles mounted respectively to said first and second saver plates and extending into said first and second undercuts respectively to route any material falling laterally of said drive roller toward a discharge end of said conveyor.

3. The apparatus of claim 2 further comprising:

a transition housing covering said conveyor belt at the output end of said tubular housing as said conveyor belt undergoes transition from a curved cross-sectional profile within said housing to a flat cross-sectional profile in driving engagement with said driver roller; and first and second mounting means for mounting said first and second bearing mounts to said transition housing, said saver plates acting to permit said roller to be adjusted longitudinally of the length of said tubular housing while preventing any contents of said conveyor belt from falling laterally off of said belt as said belt transitions about said roller.

\* \* \* \* \*